(12) United States Patent
Nanayakkara

(10) Patent No.: US 11,352,856 B2
(45) Date of Patent: Jun. 7, 2022

(54) DOWNHOLE POWER GENERATION AND DIRECTIONAL DRILLING TOOL

(71) Applicant: HALLIBURTON ENERGY SERVICES, INC., Houston, TX (US)

(72) Inventor: Ravi P. Nanayakkara, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 16/466,049

(22) PCT Filed: Jan. 20, 2017

(86) PCT No.: PCT/US2017/014327
§ 371 (c)(1),
(2) Date: Jun. 3, 2019

(87) PCT Pub. No.: WO2018/136080
PCT Pub. Date: Jul. 26, 2018

(65) Prior Publication Data
US 2019/0353009 A1    Nov. 21, 2019

(51) Int. Cl.
*E21B 41/00* (2006.01)
*E21B 7/06* (2006.01)
*H02K 7/18* (2006.01)
*H02K 11/00* (2016.01)
*H02K 11/04* (2016.01)

(52) U.S. Cl.
CPC .......... *E21B 41/0085* (2013.01); *E21B 7/068* (2013.01); *H02K 7/1807* (2013.01); *H02K 11/0094* (2013.01); *H02K 11/046* (2013.01)

(58) Field of Classification Search
CPC ......... E21B 7/06; E21B 41/0085; E21B 7/068
See application file for complete search history.

(56) References Cited

U.S. PATENT DOCUMENTS

| | | | | |
|---|---|---|---|---|
| 3,280,923 | A * | 10/1966 | Muench | E21B 44/005 |
| | | | | 376/273 |
| 3,841,420 | A * | 10/1974 | Russell | E21B 7/068 |
| | | | | 175/45 |
| 4,407,374 | A * | 10/1983 | Wallussek | E21B 4/02 |
| | | | | 175/24 |
| 5,000,272 | A * | 3/1991 | Wiebe | E21B 47/18 |
| | | | | 175/73 |
| 6,913,095 | B2 | 7/2005 | Krueger | |

(Continued)

OTHER PUBLICATIONS

International Search Report and Written Opinion dated Oct. 16, 2017, of PCT/US2017/014327, filed on Jan. 20, 2017.

*Primary Examiner* — Shane Bomar
(74) *Attorney, Agent, or Firm* — K&L Gates LLP

(57) ABSTRACT

A drilling tool with power generation includes an outer housing and a driveshaft located at least partially within the outer housing and configured to rotate with respect to the outer housing via bearings located between the driveshaft and the outer housing. The drilling tool also includes an electromagnetic power generation device. The electromagnetic power generation device includes a coil and a magnet located within the housing. One of the coil and the magnet is coupled to the housing and the other is coupled to the driveshaft. Relative movement of the driveshaft with respect to the coil generates electrical power.

16 Claims, 3 Drawing Sheets

(56) References Cited

U.S. PATENT DOCUMENTS

| | | | |
|---|---|---|---|
| 7,543,658 B2* | 6/2009 | Russell | E21B 7/068 |
| | | | 175/73 |
| 8,138,943 B2* | 3/2012 | Kusko | E21B 47/24 |
| | | | 340/855.4 |
| 8,853,879 B2 | 10/2014 | Rytlewski et al. | |
| 9,322,218 B2* | 4/2016 | Russell | E21B 4/02 |
| 2001/0042643 A1 | 11/2001 | Krueger et al. | |
| 2008/0308173 A1* | 12/2008 | Moya | H02K 15/0056 |
| | | | 140/71 C |
| 2009/0050370 A1 | 2/2009 | Peters | |
| 2010/0133833 A1 | 6/2010 | Williams | |
| 2011/0031025 A1 | 2/2011 | Kulkarni et al. | |
| 2012/0018225 A1 | 1/2012 | Peter et al. | |
| 2012/0139250 A1* | 6/2012 | Inman | F03B 15/06 |
| | | | 290/52 |
| 2013/0328442 A1* | 12/2013 | Hay | H01L 41/125 |
| | | | 310/300 |
| 2015/0180320 A1 | 6/2015 | Chambers | |
| 2015/0315902 A1* | 11/2015 | Beach | E21B 25/16 |
| | | | 175/45 |
| 2015/0337601 A1* | 11/2015 | Niina | F16K 11/0746 |
| | | | 175/40 |
| 2015/0361766 A1* | 12/2015 | Downie | E21B 41/0085 |
| | | | 175/41 |
| 2016/0333670 A1* | 11/2016 | Tegeler | H02M 7/219 |
| 2017/0002608 A1* | 1/2017 | Davis | E21B 7/067 |
| 2018/0252042 A1* | 9/2018 | Nanayakkara | E21B 4/04 |
| 2019/0100966 A1* | 4/2019 | Parkin | E21B 47/00 |
| 2020/0392791 A1* | 12/2020 | Nanayakkara | E21B 7/06 |

* cited by examiner

DOWNHOLE POWER GENERATION AND DIRECTIONAL DRILLING TOOL

BACKGROUND

Directional drilling is used to control the direction in which a borehole is drilled, to guide the borehole along a desired trajectory to a target destination. Examples of directional drilling systems include point-the-bit rotary steerable drilling systems and push-the-bit rotary steerable drilling systems. In a point-the-bit system, the drilling direction is typically changed by tilting the angle of the drill bit during drilling to point to bit in the desired direction. In a push-the-bit system, the drilling direction is typically changed by offsetting the drill bit from the center of the borehole, for example, by pushing extendable pads that exert a force against the borehole wall to push the bit the desired direction.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides methods and systems for directional drilling Specifically, the present disclosure provides a directional drilling system, such as a rotary steerable system (RSS) which generates power through rotation of a driveshaft with respect to a housing.

Figure 1:
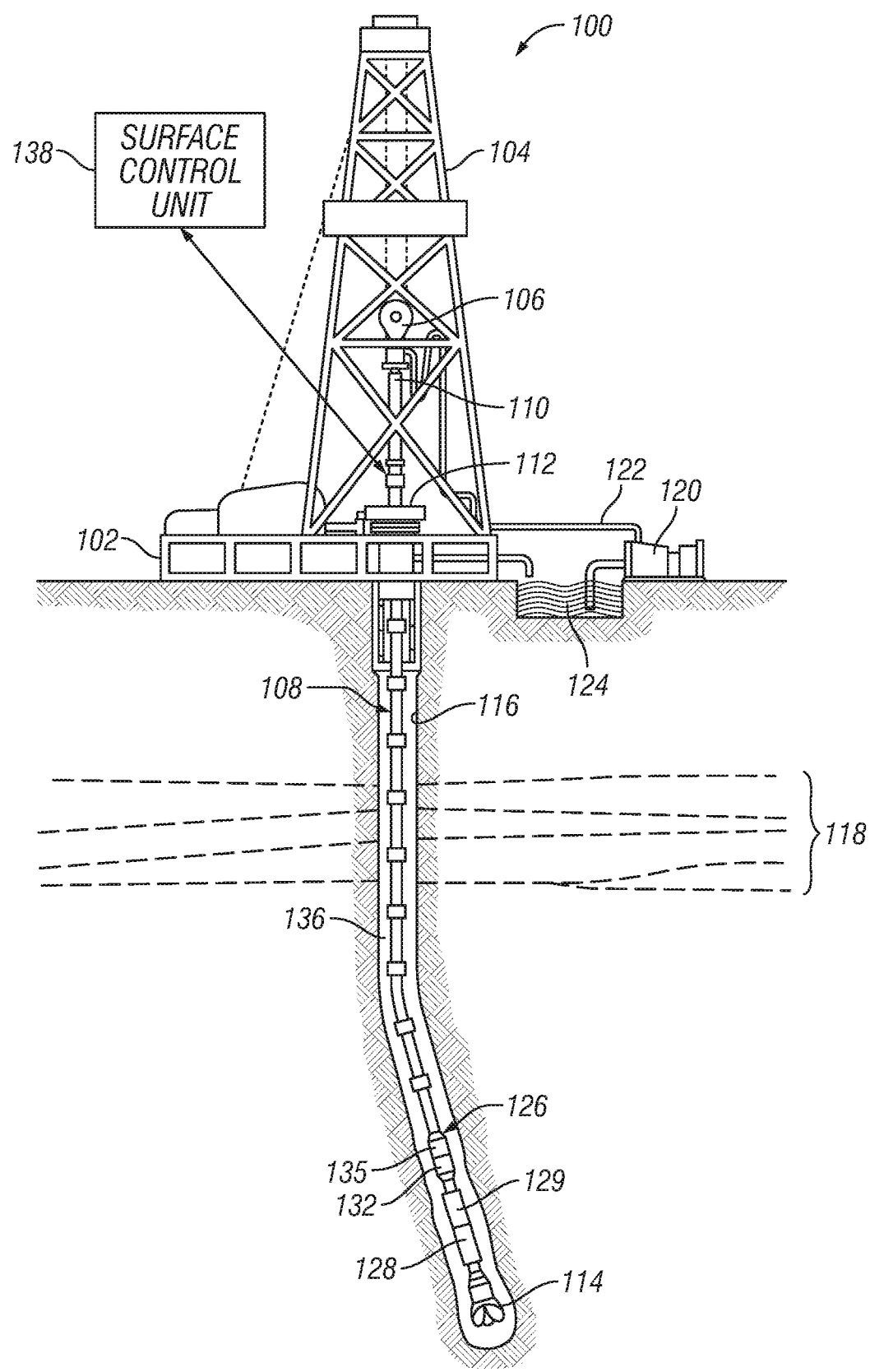
FIG. 1 depicts a schematic view of a directional drilling operation, in accordance with one or more embodiments.

Turning now to the figures, FIG. 1 depicts an elevation view of a drilling operation utilizing a directional drilling system 100, in accordance with one or more embodiments. The system of the present disclosure will be specifically described below such that the system is used to direct a drill bit in drilling a borehole, such as a subsea well or a land well. Further, it will be understood that the present disclosure is not limited to only drilling an oil well. The present disclosure also encompasses natural gas boreholes, other hydrocarbon boreholes, or boreholes in general. Further, the present disclosure may be used for the exploration and formation of geothermal boreholes intended to provide a source of heat energy instead of hydrocarbons.

Accordingly, FIG. 1 shows a tool string 126 disposed in a directionally-drilled borehole 116. The tool string 126 including a rotary steerable tool 128 providing full three dimensional (3D) directional control of the drill bit 114. A drilling platform 102 supports a derrick 104 having a traveling block 106 for raising and lowering a drill string 108. A kelly 110 supports the drill string 108 as the drill string 108 is lowered through a rotary table 112. Alternatively, a top drive can be used to rotate the drill string 108 in place of the kelly 110 and the rotary table 112. A drill bit 114 is positioned at the downhole end of the tool string 126 and may be driven by a downhole motor 129 positioned on the tool string 126 and/or by rotation of the entire drill string 108 from the surface. As the bit 114 rotates, the bit 114 forms the borehole 116 that passes through various formations 118. A pump 120 circulates drilling fluid through a feed pipe 122 and downhole through the interior of drill string 108, through orifices in drill bit 114, back to the surface via the annulus 136 around drill string 108, and into a retention pit 124. The drilling fluid transports cuttings from the borehole 116 into the pit 124 and aids in maintaining the integrity of the borehole 116. The drilling fluid may also drive the downhole motor 129.

The tool string 126 may include one or more logging while drilling (LWD) or measurement-while-drilling (MWD) tools 132 that collect measurements relating to various borehole and formation properties as well as the position of the bit 114 and various other drilling conditions as the bit 114 extends the borehole 108 through the formations 118. The LWD/MWD tool 132 may include a device for measuring formation resistivity, a gamma ray device for measuring formation gamma ray intensity, devices for measuring the inclination and azimuth of the tool string 126, pressure sensors for measuring drilling fluid pressure, temperature sensors for measuring borehole temperature, etc.

The tool string 126 may also include a telemetry module 135. The telemetry module 135 receives data provided by the various sensors of the tool string 126 (e.g., sensors of the LWD/MWD tool 132), and transmits the data to a surface unit 138. Data may also be provided by the surface unit 138, received by the telemetry module 135, and transmitted to the tools (e.g., LWD/MWD tool 132, rotary steering tool 128, etc.) of the tool string 126. Mud pulse telemetry, wired drill pipe, acoustic telemetry, or other telemetry technologies known in the art may be used to provide communication between the surface control unit 138 and the telemetry module 135. The surface unit 138 may also communicate directly with the LWD/MWD tool 132 and/or the rotary steering tool 128. The surface unit 138 may be a computer stationed at the well site, a portable electronic device, a remote computer, or distributed between multiple locations and devices. The unit 138 may also be a control unit that controls functions of the equipment of the tool string 126.

The rotary steerable tool 128 is configured to change the direction of the tool string 126 and/or the drill bit 114, such as based on information indicative of tool 128 orientation and a desired drilling direction. The rotary steerable tool 128 is coupled to the drill bit 114 and controls the direction of the drill bit 114. The rotary steerable tool 128 may be either a point-the-bit system or a push-the-bit system.

Figure 2:
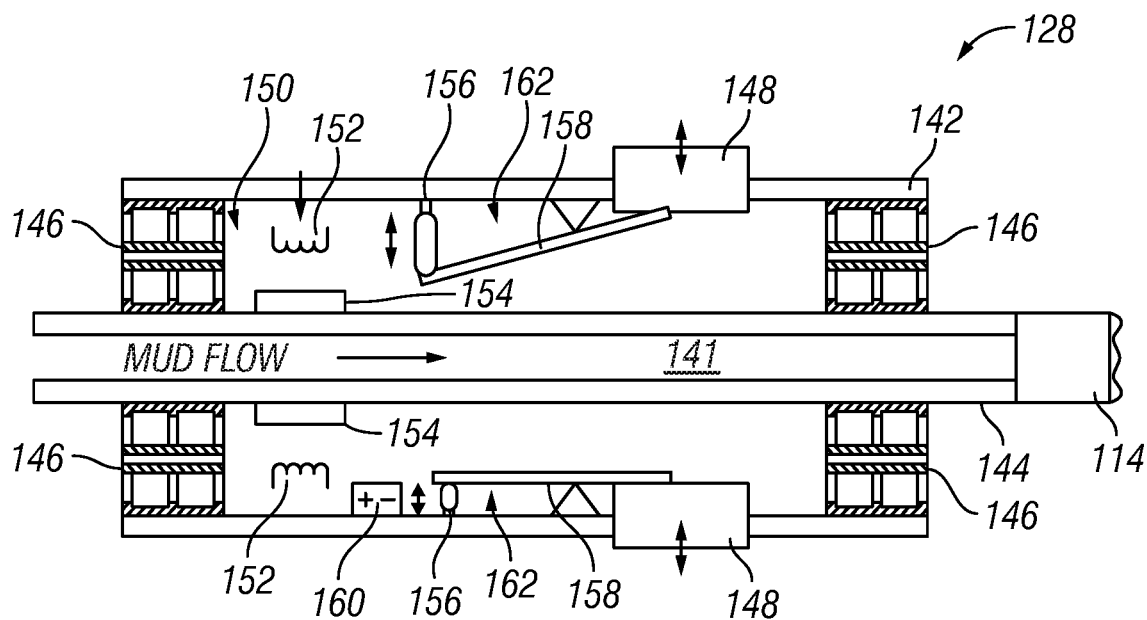
FIG. 2 depicts a cross-sectional schematic view of an rotary steerable tool with power generation, in accordance with one or more embodiments.

FIG. 2 depicts a cross-sectional schematic view of the rotary steerable tool 128 of FIG. 1, according to one or more embodiments. The tool 128 includes an outer housing 142 and a driveshaft 144 located at least partially within the outer housing 142 and supported by bearings 146 located between the driveshaft and the outer housing 142 for rotation of the driveshaft 144 with respect to the outer housing 142. The bearings 146 may be any type of bearing that facilitates relative motion between the outer housing 142 and the driveshaft 144. The bearings 146 provide a certain amount of friction between the driveshaft 144 and the outer housing 142 such that the driveshaft 144 applies a torque on the outer housing 142 during rotation, rotating the outer housing 142 with the driveshaft 144. Alternatively, seals or a locking device such as splines, detents, and the like, may be used to couple the driveshaft 144 with the housing 142.

The driveshaft 144 is rotatable about an axis of rotation and includes an axial flow bore 141 generally coinciding or aligned with the axis of rotation for transmitting drilling fluid to the drill bit 114 as shown in FIG. 1. Rotation of the driveshaft 144 may be driven by the downhole motor 129, such as a mud motor, or by a top drive from the surface. Rotation of the driveshaft 144 causes rotation of the drill bit 114, which enables drilling of the borehole.

The rotary steerable tool 128 further includes an electromagnetic power generation device 150 located inside the tool 128. The electromagnetic power generation device 150 includes one or more coils 152 located within and stationarily mounted to the outer housing 142, and one or more magnets 154 mounted to the driveshaft 144 facing the coils 152. The magnets 154 may be coupled to the outer housing 142 and the coils 152 may be coupled to the driveshaft 144. Generally, a stator of the electromagnetic power generation device 150 may be coupled to the outer housing 142 and a rotor of the electromagnetic power generation device 150 may be coupled to driveshaft 144. Thus, as the driveshaft 144 rotates with respect to the outer housing 142 during drilling, the rotor, such as the magnets 154, rotates with respect to the stator, such as the coils 152. Thus, power is generated by the electromagnetic power generation device 150. In an alternate configuration, the coils 152 need not be mounted to move with the outer housing 142 but may instead be mounted to another object as long as there is relative rotation between the coils 152 and the rotating driveshaft 144.

The electromagnetic power generation device 150 may generate three-phase power in which the coils 152 include A-B-C phase windings. The electromagnetic power generation device 150 may be an alternator, an induction generator such as a permanent magnet synchronous generator, a doubly fed electric machine, or any other type of power generation utilizing rotation to generate power.

The electromagnetic power generation device 150 may generate AC voltage and convert the AC voltage into a DC voltage before it is consumed by the components. The power generated by the electromagnetic power generation device 150 may be stored in a power storage device 160 located on the rotary steerable tool 128. The generated power can be used to power various power components of the rotary steerable tool 128, such as processors, sensors, actuators, and the like. Additionally, the power generated by the electromagnetic power generation device 150 can also be used to power other components of the tool string 126 such as the telemetry module 135, the LWD/MWD tool 132, or any other type of power-consuming devices.

The rotary steerable tool 128 further includes one or more borehole engagement members 148 radially extendable outwardly from and moveable with the outer housing 142. The borehole engagement members 148 may optionally include a traction member that facilitates stationary contact and friction between the borehole engagement members 148 and the borehole wall. The traction member may include a pad, a textured surface, or any other gripping element(s).

The borehole engagement members 148 are controlled by an actuation system 162 which is powered by the electromagnetic power generation device 250. The example actuation system 162 illustrated in FIG. 2 is an electromechanical actuation system, which includes a solenoid type actuator 156 and a lever 158. When actuated, the actuator 156 pushes the lever 158 which pushes the borehole engagement member outward from the outer housing 142. The borehole engagement member 148 may be retracted via the actuation system 162 as well. For example, the borehole engagement members 148 may be coupled to springs (not shown) which retract the borehole engagement members 148 back towards the outer housing 142 upon release of the actuator 156. It should be appreciated that any type of electrically powered or operated actuation system suitable for actuating the borehole engagement members 148 may be used.

Figure 3:
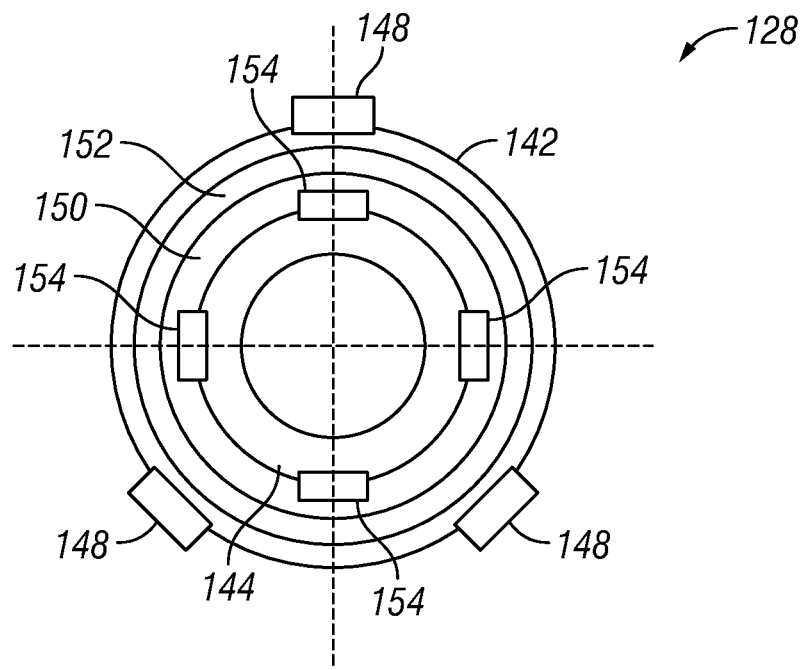
FIG. 3 depicts a radial cross-sectional schematic view of the rotary steerable tool, in accordance with one or more embodiments.

FIG. 3 depicts a cross-sectional schematic view of the rotary steerable tool 128. The coils 152 of the electromagnetic power generation device 150 are coupled to and located within the outer housing 142, facing the driveshaft 144. The magnets 154 of electromagnetic power generation device 150 are coupled to the driveshaft 144 facing the coils 152. The borehole engagement members 148 extend radially from the outer housing 142. The electromagnetic power generation device 150 may include a plurality of magnets located in radially symmetric locations on the driveshaft 144. The tool 128 may also include a plurality of borehole engagement members 148 located on the outer housing 142, and in radially symmetric locations.

Figure 4:
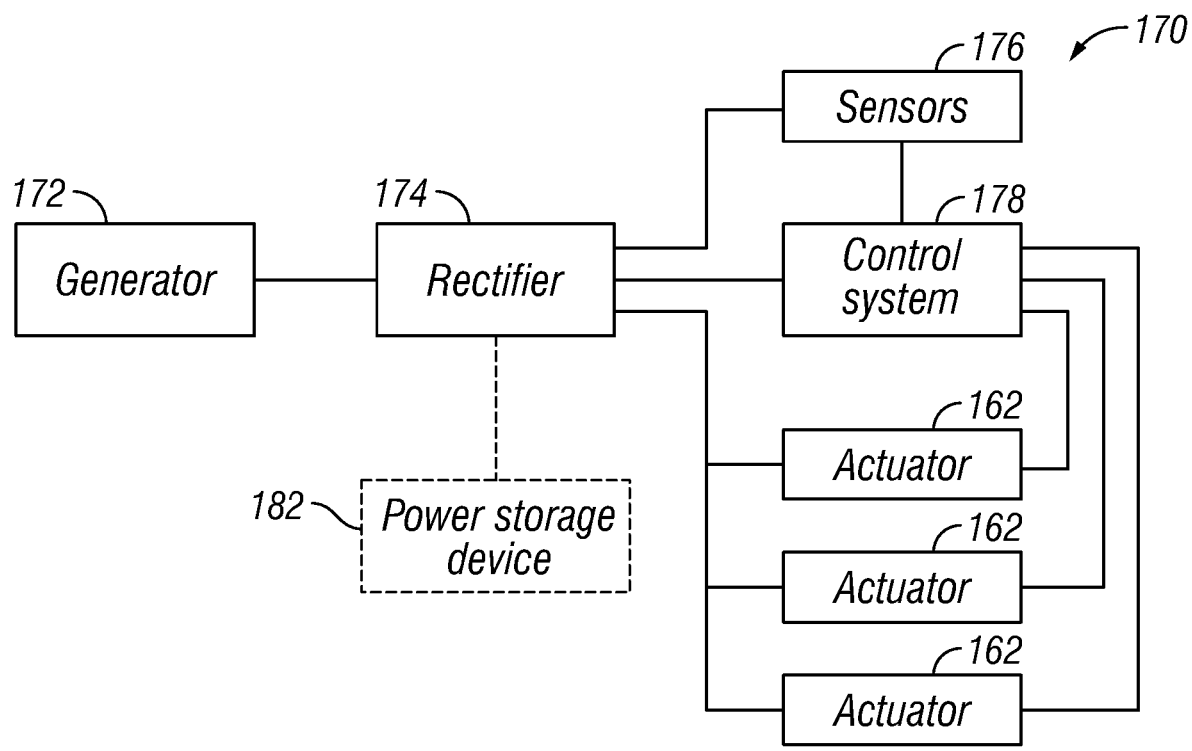
FIG. 4 depicts a block diagram of an electronic system of the rotary steerable tool, in accordance with one or more embodiments.

FIG. 4 depicts a block diagram of an electronic system 170 of the rotary steerable tool 128. The electronic system 170 includes a power generator 172, such as the electromagnetic power generation device 150 of FIG. 2, and a rectifier 174, which converts the AC power generated by the generator 172 into DC power. In some embodiments, the system 170 may also include a power storage device 182. The power can then be used to power one or more sensors 176, such as accelerometers, gyroscopes, magnetometers, GPS devices, temperature sensors, pressure sensors, among others, and in any combination. The generated power can also be used to power a control system 178 of the rotary steerable tool 128 as well as one or more actuation systems 162. The sensors 176 monitor one or more drilling parameters, such as the position and location of the rotary steerable tool 128 with respect to the well and a drilling target.

Data collected by the sensors 176 is sent to the control system 178, which utilizes the data to control the actuation systems 162, thereby controlling extension and retraction of the borehole engagement members 148 (FIG. 2). As the tool 128 rotates and drills the borehole, the sensors 176 (e.g., accelerometers, magnetometers, and/or gyroscopes) continuously feed measurements to the control system 148, which uses the measurements to continuously track the position of the tool 128 with respect to the target drilling direction in real time. The control system 178 can determine which direction to direct the drill bit 114 (FIG. 1), and thus when to extend and retract the borehole engagement members 148. The control system 178 may use a pulse-width modulated signal to control the extension and retraction of the borehole engagement members 148.

Since the location of the borehole engagement members 148 are fixed with respect to the outer housing 142, the location of the borehole engagement members 148 can be derived from the location and position of the outer housing 142. The control system 178 can then determine when to actuate the borehole engagement members 148 in order to direct the drill bit 114 in the desired direction. Each of the borehole engagement members 148 on the tool 128 can be actuated independently, in any combination, and at any time interval, which allows for agile, full three dimensional control of the direction of the drill bit 114. The directional control may be relative to gravity toolface, magnetic toolface, or gyro toolface.

For example, if the drill bit 114 needs to be directed towards high side (0 degree toolface angle), then the borehole engagement member 148 is extended and pushed against the borehole at the 180 degree location of the tool 128 (FIG. 1). This pushes the drill bit 114 off center and the borehole is drilled at the respective angle. When the drilling angle needs to be changed, the borehole engagement member 148 is retracted. It should be appreciated that any suitable control technique for steering the drill bit 114 may be used.

The control system 178 may be in communication with the surface control unit 138 (FIG. 1). The surface control unit 138 may send instructions or information to the processor such as the information related to the profile of the drilling operation such as location of the drilling target, rate of direction change, and the like. The surface control unit 138 may receive spontaneous control commands from an operator which are relayed as processor-readable commands to control system 408. The surface control unit 138 can also send preprogrammed commands to the control system 178 set according to the profile of the drilling operation. The control system 178 and/or the sensors 176 may be powered by the electromagnetic power generation device 172 or by an alternate power source such as a battery.

Figure 5:
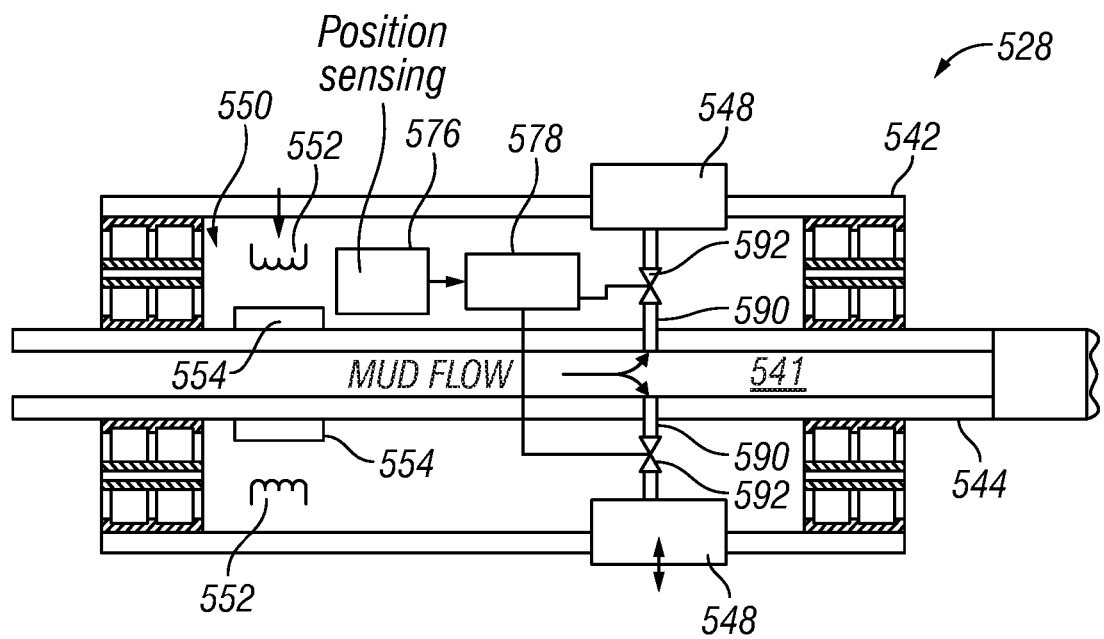
FIG. 5 depicts a cross-sectional diagram of another example rotary steering tool with power generation, in accordance with one or more embodiments.

FIG. 5 depicts a cross-sectional schematic view of another embodiment of a rotary steering tool 528. Rotary steering tool 528 includes an actuation system 550 which utilizes drilling fluid in the driveshaft 544 to push the borehole engagement members 548 outward from the outer housing 542. Specifically, the actuation system 550 includes one or more hydraulic paths 590 coupling the flowbore 541 of the driveshaft 544 to a piston (not shown) within the hydraulic paths 590 coupled to the borehole engagement members 548. Opening and closing of the hydraulic paths 590 is controlled by solenoid valves 592. The control system 578 is in electrical communication with the solenoid valves 592 to provide a control signal that actuates the valves 592. Actuation of one of the solenoid valves 592 allows the drilling fluid to flow into one of the hydraulic paths 590 and push the piston (not shown) outward, which in turn, extends the borehole engagement members 548.

In addition to the embodiments described above, many examples of specific combinations are within the scope of the disclosure, some of which are detailed below:

Example 1: A drilling tool, comprising:
  a housing;
  a driveshaft located at least partially within the housing and rotatable with respect to the housing; and
  an electromagnetic power generation device including a coil and a magnet located within the housing, wherein one of the coil and the magnet is coupled to the housing and the other is coupled to the driveshaft, and wherein relative movement of the driveshaft with respect to the coil generates electrical power.

Example 2: The drilling tool of example 1, further comprising:
  an borehole engagement member extendable radially and outwardly from the housing; and
  an actuation system that controls extension of the borehole engagement member.

Example 3: The drilling tool of example 2, wherein the actuation system is powered by the electromagnetic power generation device.

Example 4: The drilling tool of example 2, wherein the actuation system comprises a hydraulic, pneumatic, mechanical, or electrical actuation system.

Example 5: The drilling tool of example 1, wherein the electromagnetic power generation device comprises a permanent magnet synchronous generator.

Example 6: The drilling tool of example 1, wherein the electromagnetic power generation device is configured to generate three-phase power.

Example 7: The drilling tool of example 1, further comprising a power storage device in which power generated by the electromagnetic power generation device is stored.

Example 8: The drilling tool of example 2, wherein the borehole engagement member is pushed out via drilling fluid flowing through the driveshaft, and wherein flow of the drilling fluid to the borehole engagement member is controlled by a solenoid valve.

Example 9: The drilling tool of example 1, wherein the electromagnetic power generation device further comprises a plurality of coils and a plurality of magnets.

Example 10: A drilling tool, comprising:
  a housing;
  a driveshaft located at least partially within the housing and rotatable with respect to the housing; and
  a borehole engagement member extendable radially and outwardly from the housing;
  an actuation system that controls extension of the borehole engagement member; and
  an electromagnetic power generation device including a coil and a magnet located within the housing, wherein one of the coil and the magnet is coupled to the housing and the other is coupled to the driveshaft, and wherein relative movement of the driveshaft with respect to the coil generates electrical power.

Example 11: The drilling tool of example 10, wherein the actuation system is powered by the electromagnetic power generation device.

Example 12: The drilling tool of example 10, wherein the electromagnetic power generation device comprises:
  a plurality of coils coupled to the housing and located between the housing and the driveshaft; and
  a plurality of magnets coupled to the driveshaft and located between the housing and the driveshaft.

Example 13: The drilling tool of example 10, wherein the electromagnetic power generation device generates AC voltage and converts the AC voltage into a DC voltage.

Example 14: The drilling tool of example 10, wherein the actuation system is a hydraulic, pneumatic, mechanical, or electrical actuation system.

Example 15: The drilling tool of example 14, wherein the actuation system utilizes drilling fluid flowing through the driveshaft to control extension of the borehole engagement members.

Example 16: The drilling tool of example 10, wherein the electromagnetic power generation device comprises a permanent magnet synchronous generator.

Example 17: A method of drilling a borehole, comprising:
  rotating a driveshaft coupled to a drill bit, wherein the driveshaft is coupled to a rotor of an electromagnetic power generation device and rotatable relative to a stator of the electromagnetic power generation device;
  generating power via the power generation device; and
  powering one or more components with the generated power.

Example 18: The method of example 17, further comprising:
  powering a radially extendable borehole engagement member with the generated power; and radially extending the radially extendable borehole engagement member to deviate the borehole.

Example 19: The method of example 17, further comprising powering one or more sensing devices with the generated power.

Example 20: The method of example 17, further comprising storing the generated power in a power storage device.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A drilling tool, comprising:
a housing;
a driveshaft located at least partially within the housing and rotatable with respect to the housing;
an electromagnetic power generation device including a coil and a magnet located within the housing, wherein one of the coil and the magnet is coupled to the housing and the other is coupled to the driveshaft, and wherein relative movement of the magnet with respect to the coil generates electrical power,
a borehole engagement member extendable radially and outwardly from the housing via drilling fluid flowing through the driveshaft;
an actuation system that controls extension of the borehole engagement member; and
a solenoid valve operable to control flow of the drilling fluid to the borehole engagement member.

2. The drilling tool of claim 1, wherein the actuation system is powered by the electromagnetic power generation device.

3. The drilling tool of claim 1, wherein the actuation system comprises a hydraulic, pneumatic, mechanical, or electrical actuation system.

4. The drilling tool of claim 1, wherein the electromagnetic power generation device comprises a permanent magnet synchronous generator.

5. The drilling tool of claim 1, wherein the electromagnetic power generation device is configured to generate three-phase power.

6. The drilling tool of claim 1, further comprising a power storage device in which power generated by the electromagnetic power generation device is stored.

7. The drilling tool of claim 1, wherein the electromagnetic power generation device further comprises a plurality of coils and a plurality of magnets.

8. A drilling tool, comprising:
a housing;
a driveshaft located at least partially within the housing and rotatable with respect to the housing;
a borehole engagement member extendable radially and outwardly from the housing;
an actuation system that controls extension of the borehole engagement member, wherein the actuation system is an electromechanical or a hydraulic actuation system that utilizes drilling fluid flowing through the driveshaft to control extension of the borehole engagement member; and
an electromagnetic power generation device including a coil and a magnet located within the housing, wherein one of the coil and the magnet is coupled to the housing and the other is coupled to the driveshaft, and wherein relative movement of the magnet with respect to the coil generates electrical power.

9. The drilling tool of claim 8, wherein the actuation system is powered by the electromagnetic power generation device.

10. The drilling tool of claim 8, wherein the electromagnetic power generation device comprises:
a plurality of coils coupled to the housing and located between the housing and the driveshaft; and
a plurality of magnets coupled to the driveshaft and located between the housing and the driveshaft.

11. The drilling tool of claim 8, wherein the electromagnetic power generation device generates AC voltage and converts the AC voltage into a DC voltage.

12. The drilling tool of claim 8, wherein the electromagnetic power generation device comprises a permanent magnet synchronous generator.

13. A method of drilling a borehole, comprising:
rotating a driveshaft coupled to a drill bit, wherein the driveshaft is coupled to a rotor of an electromagnetic power generation device and rotatable relative to a stator of the electromagnetic power generation device, the electromagnetic power generation device including a coil and a magnet, wherein one of the coil and the magnet is coupled to the rotor and the other is coupled to the stator;

generating power via the power generation device by moving the magnet with respect to the coil; and powering an actuation system with the generated power, wherein the actuation system is an electromechanical or a hydraulic actuation system that utilizes drilling fluid flowing through the driveshaft to control radial extension of a borehole engagement member.

14. The method of claim 13, further comprising radially extending the borehole engagement member to deviate the borehole.

15. The method of claim 13, further comprising powering one or more sensing devices with the generated power.

16. The method of claim 13, further comprising storing the generated power in a power storage device.

* * * * *